(12) United States Patent
Hopcraft

(10) Patent No.: US 10,674,371 B2
(45) Date of Patent: Jun. 2, 2020

(54) NETWORK TABLE ERROR DETECTION USING CALL TRACE RECORDS

(71) Applicant: NetScout Systems, Inc., Westford, MA (US)

(72) Inventor: Geoff Hopcraft, Piedmont, CA (US)

(73) Assignee: NetScout Systems, Inc., Westford, MA (US)

( * ) Notice: Subject to any disclaimer, the term of this patent is extended or adjusted under 35 U.S.C. 154(b) by 209 days.

(21) Appl. No.: 15/486,036

(22) Filed: Apr. 12, 2017

(65) Prior Publication Data

US 2018/0302799 A1    Oct. 18, 2018

(51) Int. Cl.
| | |
|---|---|
| *H04W 16/18* | (2009.01) |
| *H04L 12/24* | (2006.01) |
| *H04W 4/02* | (2018.01) |
| *H04W 24/10* | (2009.01) |
| *H04W 24/08* | (2009.01) |
| *H04L 12/26* | (2006.01) |

(Continued)

(52) U.S. Cl.
CPC ......... *H04W 16/18* (2013.01); *H04L 41/0654* (2013.01); *H04L 41/0677* (2013.01); *H04L 41/0866* (2013.01); *H04L 43/0811* (2013.01); *H04W 4/02* (2013.01); *H04W 24/08* (2013.01); *H04W 24/10* (2013.01); *H04L 41/12* (2013.01); *H04L 41/5009* (2013.01); *H04M 3/22* (2013.01); *H04M 15/58* (2013.01); *H04W 24/02* (2013.01); *H04W 84/042* (2013.01); *H04W 88/02* (2013.01)

(58) Field of Classification Search
CPC ..... H04W 24/08; H04W 24/02; H04W 16/18; H04M 3/2218; H04M 15/41; H04M 15/58
USPC .................................................. 455/405, 446
See application file for complete search history.

(56) References Cited

U.S. PATENT DOCUMENTS

| | | |
|---|---|---|
| 6,958,979 B2 | 10/2005 | Bulick et al. |
| 9,001,761 B2 | 4/2015 | Chun et al. |

(Continued)

FOREIGN PATENT DOCUMENTS

EP    208881 A1    1/1987

OTHER PUBLICATIONS

Extended European Search Report for European Patent Application No. EP18166732.0, dated Jun. 28, 2018.

*Primary Examiner* — Jaime M Holliday
(74) *Attorney, Agent, or Firm* — Locke Lord LLP; Scott D. Wofsy; Christopher J. Capelli (57) ABSTRACT

A system for correcting network planning data includes a planning repository containing information related to network traffic, network element locations and network element connectivity. The system further includes a repository of a wireless network that includes a plurality of call trace records. In addition, the system includes an information processing system including a processor and a memory device coupled to the processor in communication with the planning database and with the repository of the wireless network. The memory device contains a set of instructions that, when executed by the processor, cause the processor to receive at least of the plurality of call trace records from the repository of the wireless network and cause the processor to compare information in the at least one call trace record with corresponding information stored in the planning repository to identify one or more errors in the information stored in the planning repository.

18 Claims, 4 Drawing Sheets

(51) Int. Cl.
*H04W 88/02* (2009.01)
*H04W 84/04* (2009.01)
*H04M 15/00* (2006.01)
*H04M 3/22* (2006.01)
*H04W 24/02* (2009.01)

(56) References Cited

U.S. PATENT DOCUMENTS

| | | | |
|---|---|---|---|
| 9,253,663 | B2 | 2/2016 | Raleigh et al. |
| 9,369,569 | B1* | 6/2016 | Lam ................. H04M 15/55 |
| 2004/0067759 | A1* | 4/2004 | Spirito ................. H04W 64/00 |
| | | | 455/456.1 |
| 2009/0203373 | A1* | 8/2009 | Alvarez Medina ... H04L 41/147 |
| | | | 455/423 |
| 2015/0256237 | A1* | 9/2015 | George ................. H04B 7/024 |
| | | | 375/267 |
| 2015/0271330 | A1* | 9/2015 | Erel ................. H04M 3/42221 |
| | | | 379/265.03 |
| 2015/0304222 | A1* | 10/2015 | Ko ................. H04W 40/24 |
| | | | 370/241 |
| 2016/0135067 | A1* | 5/2016 | Morad ................. H04M 15/41 |
| | | | 455/423 |

* cited by examiner

NETWORK TABLE ERROR DETECTION USING CALL TRACE RECORDS

FIELD OF THE INVENTION

This specification is directed, in general, to mobile communications, and, more particularly, to network table error detection using call trace records.

BACKGROUND OF THE INVENTION

Typically, mobile communication systems are cellular systems, i.e. a coverage area of a mobile communication network is made up of cells, the coverage area of each cell being covered by one base transceiver station and the cells usually slightly overlapping with surrounding cells. Network operators control a mobile communication system by means of one or more network management systems (NMS) Each cell in a cellular network should be identified individually in order for the NMS to be able to control and monitor the mobile communication network in order to enable cell-specific services of the mobile communication systems to be provided and in order to enable mobile devices to check whether or not they have user rights to the services. Cellular network operators maintain a database of information about the transmitting elements in their network. Information stored in such database may come from variety of sources, including various intelligent network planning tools. The database may contain information on network traffic, component locations, and component connectivity.

Previous studies across a variety of operators have shown that the planning data, while roughly correct, will typically have a significant number of errors. Measuring accurately a time-delay for the uplink and downlink data often proves to be difficult. In addition, site acquisition difficulties, network maintenance, tool migration and acquisitions can all cause variance between the plan and the actual installation. In practice, tests in various markets have shown between tens and hundreds meaningful errors per market.

Detecting these errors is normally very time consuming and requires performance of numerous verification tests to assure the accuracy of the planning data. Accordingly, there is a need for an improved method of network table error detection.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for correcting network planning data includes a planning repository containing information related to network traffic, network element locations and network element connectivity. The system further includes a repository of a wireless network that includes a plurality of call trace records. In addition, the system includes an information processing system including a processor and a memory device coupled to the processor in communication with the planning database and with the repository of the wireless network. The memory device contains a set of instructions that, when executed by the processor, cause the processor to receive at least of the plurality of call trace records from the repository of the wireless network and cause the processor to compare information in the at least one call trace record with corresponding information stored in the planning repository to identify one or more errors in the information stored in the planning repository.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention relate to monitoring performance of a wireless communications network and automatically correcting network data stored in a planning repository. In many wireless communications networks, operators typically maintain various network related information that comes from various sources, including various network planning tools. However, such data may have multiple errors. Such errors may include, for example, actual cells that are not present in the planning data. As another non-limiting example, the planning database may contain various node information about nodes with uncalibrated cable or fiber delays. In addition, at least some DAS nodes (described below in conjunction with FIG. 2) may be erroneously identified as macro cells. To correct errors in the repository of a wireless communication network containing both legacy and modern Radio Access Technology (RAT), an information processing system dedicated to error correction is configured to analyze a plurality of call trace records and timing advance data to identify at least some errors. Depending on errors, a network monitoring system extracts different sets of information, removes redundant information, and focuses on means for automatic detection of planning data errors without recourse to large-scale drive tests, which can be expensive to implement across a number of cell locations across a defined geographical area (e.g., a city).

In an embodiment of the present invention, the network monitoring system may collect and analyze a subset of stored call trace records. The network monitoring system may compare information in the call trace records with corresponding information stored in the planning repository. The performed analysis enables automatic identification of errors in the information stored in the planning repository using stored call trace records. Hence, the network monitoring system can facilitate more efficient, uniform and effective planning data correction.

Figure 1:
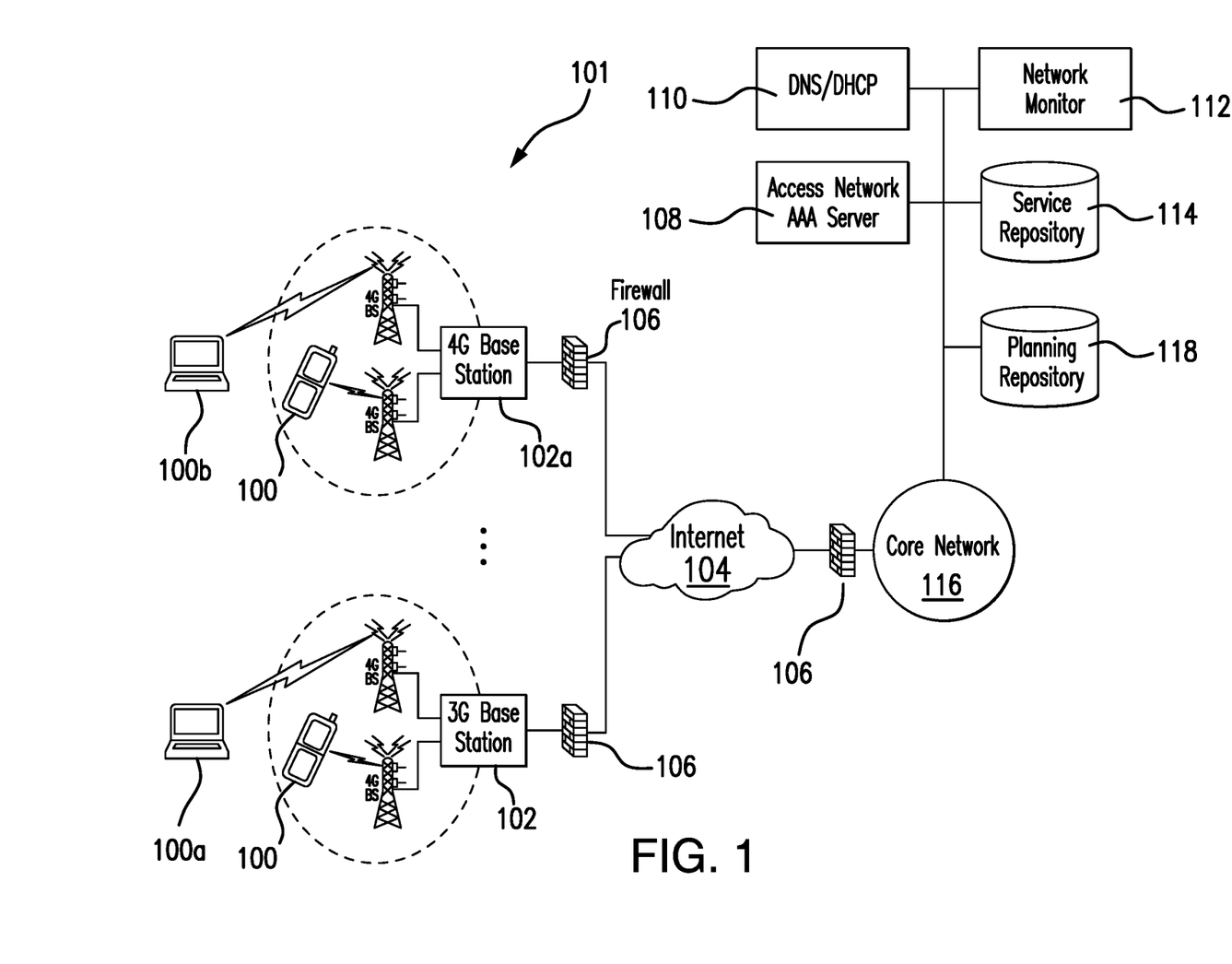
FIG. 1 illustrates a simplified wireless network architecture in accordance with some embodiments of the present invention.

FIG. 1 illustrates a simplified network architecture in accordance with some embodiments. As shown, this provides for a simplified service infrastructure that exemplifies a simplified and "flattened" network architecture in accordance with some embodiments that is advantageous for wireless network architectures. This also reduces the need for complex data path protocol interaction between the base station and network infrastructure. For example, in contrast to a complex edge and core network infrastructure connecting base stations to the central service provider network, as shown the base stations 102 are connected directly to the Internet 104 via firewalls 106 (in some embodiments, the base stations 102 include the firewall functionality 106). Base station control plane communication for access network AAA (Authentication, Authorization, and Accounting) server 108, DNS/DHCP (Domain Name System/Dynamic Host Configuration Protocol) server 110, mobile network monitor 112 or other necessary functions are accomplished, for example, with a secure IP tunnel or TCP connection between the central provider network and the base stations. The base station 102 is used to refer to multiple base station embodiments where the base station itself is directly connected to the RAN, or where the base station connects to a base station controller or base station aggregator function that in turn connects to the RAN, and all such configurations are collectively referred to herein as base station 102 in FIG. 1 and most figures that follow that reference base station 102 as described below.

Base stations 102a in 4G network may also be referred to as an eNodeB, a node B, an access point, and the like. Each eNodeB 102a may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB 102a may provide communication coverage for a macro cell, a pico cell, a femto cell, and/or other types of cell. A macro cell generally covers a relatively large geographic area (e.g., several kilometers in radius) and may allow unrestricted access by devices 100 (also sometimes and interchangeably referred to herein as user equipment) with service subscriptions with the network provider. A pico cell would generally cover a relatively smaller geographic area and may allow unrestricted access by devices with service subscriptions with the network provider. A femto cell would also generally cover a relatively small geographic area (e.g., a home) and, in addition to unrestricted access, may also provide restricted access by devices 100 having an association with the femto cell (e.g., devices for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. An eNodeB 102*a* may support one or multiple (e.g., two, three, four, and the like) cells.

As shown, the wireless network 101 is both 3G and 4G capable, the devices 100 can be either 3G, 4G or multi-mode 3G and 4G. Those of ordinary skill in the art will also appreciate that in the more general case, the network could be 2G, 3G, 4G and 5G capable, or the device could be 2G, 3G, 4G and 5G capable with all or a subset of Global System for Mobile (GSM), General Packet Radio Service (GPRS), Code Division Multiple Access (CDMA) 1×, High Speed Packet Access (HSPA), Evolution Data Optimized (EVDO), Long Term Evolution (LTE) and WiMax modem capability. If the devices are single mode, then the 3G devices 100*a* will be activated with a service profile that is consistent with the 3G network capacity and speed, and the 4G devices 100*b* will be activated with service profiles that are consistent with 4G network capacity and speed.

In some embodiments, if the base station data plane traffic is transmitted via the Internet 104 as discussed above, then IPDRs (Internet Protocol Detail Records, also sometimes and interchangeably referred to herein as Call Trace Records or CTRs, which as used herein refer to any network measure of service usage or service activity for voice and/or data traffic (e.g., CTRs can include a time stamp, a device ID, and various levels of network measures of service usage for the device associated with that device ID, such as perhaps total traffic usage, network destination, time of day or device location)) are generated by and collected from the access network equipment. Depending on the specific network configuration, as discussed herein, for a WWAN network the CTRs can be generated by one or more of the following: base station 102, RAN or transport gateways and AAA 108. In some access network embodiments, the CTRs are transmitted to equipment functions that aggregate the CTRs for the purpose of service billing and other functions. Aggregation can occur in the AAA, the transport gateways or other functions including the billing system 123. As discussed below, it is often the case that the IPDRs is assumed to be obtained from the AAA server 108 and/or a service repository 114 (e.g., a real-time service usage collection stored in a database or a delayed feed service usage collection stored in a database), or some other network function. However, this does not imply that the CTRs may not be obtained from a variety of other network functions, and in some embodiments, the CTRs are obtained from other network functions as disclosed herein. In some embodiments, existing CTR sources are utilized to obtain network based service usage measures for multiple purposes. Certain types of CTRs can be based on, or based in part on, what are sometimes referred to as CDRs (Charging Data Records, which can track charges for voice and data usage) or modifications of CDRs. In some embodiments it is advantageous to take advantage of network based service monitoring or control for those service aspects the network is capable of supporting, while using device assisted service monitoring or control for the service aspects advantageously implemented on the device.

In some embodiments, where base station data plane traffic is backhauled and concentrated in a core network 116, the CTRs can originate in the base stations or a router or gateway in the core network 116, and the CTRs are collected at the AAA server 108 and stored in the service repository 114. As discussed below, it is assumed that the CTRs are obtained from the AAA server 108, and it is understood that the source of the CTRs is interchangeable in the embodiments.

In some embodiments, the CTR information is used by the mobile network monitor 112 and/or other network apparatus or device apparatus to implement planning data correction as described below. In some embodiments, a CTR feed flows between network elements. For example, a CTR feed can flow from a RAN gateway (not shown in FIG. 1) and a transport gateway (not shown in FIG. 1). In other embodiments, the CTRs originate and flow from the base station 102 or some other component/element in the network. In some embodiments, one or more of these CTR feeds is transmitted to a CTR aggregation function. For example, this aggregation function can be located in the AAA server 108, in the mobile network monitor 112, or in some other network element. This aggregation function collects the CTR feeds into a database with an entry for each device 100. At some point in time (e.g., at the end of a specified time period, at the end of a device network connection session and/or at a specified time of day), the CTR aggregation function sends summary information or detailed information of the CTRs for a given device or group of devices to the service repository 114.

In some embodiments, further distribution of central provider access networking functions such as access network AAA server 108, DNS/DHCP server 110, and other functions are provided in the base stations 102. In some embodiments, network based device service suspend/resume control are also provided in the base stations 102 (or in some embodiments, for hierarchical or overlay networks, this function is provided by one or more of the following: RAN gateways, transport gateways, AAA 108 or some other network function). As shown, the following are connected (e.g., in network communication with) the core network 116: central provider DNS/DHCP server 110, access network AAA server 108, service repository 114, mobile network monitor 112 and a planning repository 118. These embodiments may be advantageous particularly for flat networks as that shown in FIG. 1.

In some embodiments, the base stations 102 implement a firewall function via firewall 106 and are placed directly onto the local loop Internet for backhaul. Voice traffic transport is provided with a secure protocol with Voice Over IP (VOIP) framing running over a secure IP session, for example, Virtual Private Network (VPN), IP Security (IP-SEC) or another secure tunneling protocol. In some embodiments, the VOIP channel employs another layer of application level security on the aggregated VOIP traffic trunk before it is placed on the secure IP transport layer. Base station control traffic and other central provider traffic can be provided in a number of ways with secure transport protocols running over Transmission Control Protocol (TCP), Internet Protocol (IP) or User Datagram Protocol (UDP), although TCP provides a more reliable delivery channel for control traffic that is not as sensitive to delay or jitter.

In some embodiments, at least a basic traffic monitoring or service monitoring function is performed at the base station (e.g., base stations 102) similar to the service history records or CTRs collected deeper in the network in more conventional hierarchical access network infrastructure architectures. For example, the service or traffic monitoring history records are advantageous for tracking device network service usage or service activity behavior. In some embodiments, the base station traffic monitor can record and report IP addresses or include a DNS lookup function to report IP addresses or IP addresses and associated Uniform Resource Locators (URLs). Another example allows the base station 102 to attach location data to the CTRs to provide device location data in the records. In some embodiments, traffic inspection includes recording deeper levels of traffic or service monitoring. In some embodiments, base stations 102 may comprise DAS structure (described below in conjunction with FIG. 2).

Generally, prior to operating a wireless network, such as the wireless network 101 shown in FIG. 1 a network planning stage typically takes place over a sequence of study periods. The configuration and loading of the planned network are stored in a planning database, shown generally as planning repository 118. In a preferred embodiment, the planning repository 118 and service repository 114 are implemented using at least one relational database, such as ORACLE from Oracle Corporation. The planning repository 118 includes information on network component connectivity. For instance, such information may describe the core network connectivity between base stations 102 and network elements connected to each base station 102. Information stored in the planning repository also includes the location of each component in network 101 together with geographic information. In an embodiment, component geographic location is specified using V and H coordinates as is well known in the telecommunication art. Information includes metropolitan service area (MSA) for each base station 102, North American Numbering Plan (NANP) data, NXX (local exchange) data, and the like.

Figure 2:
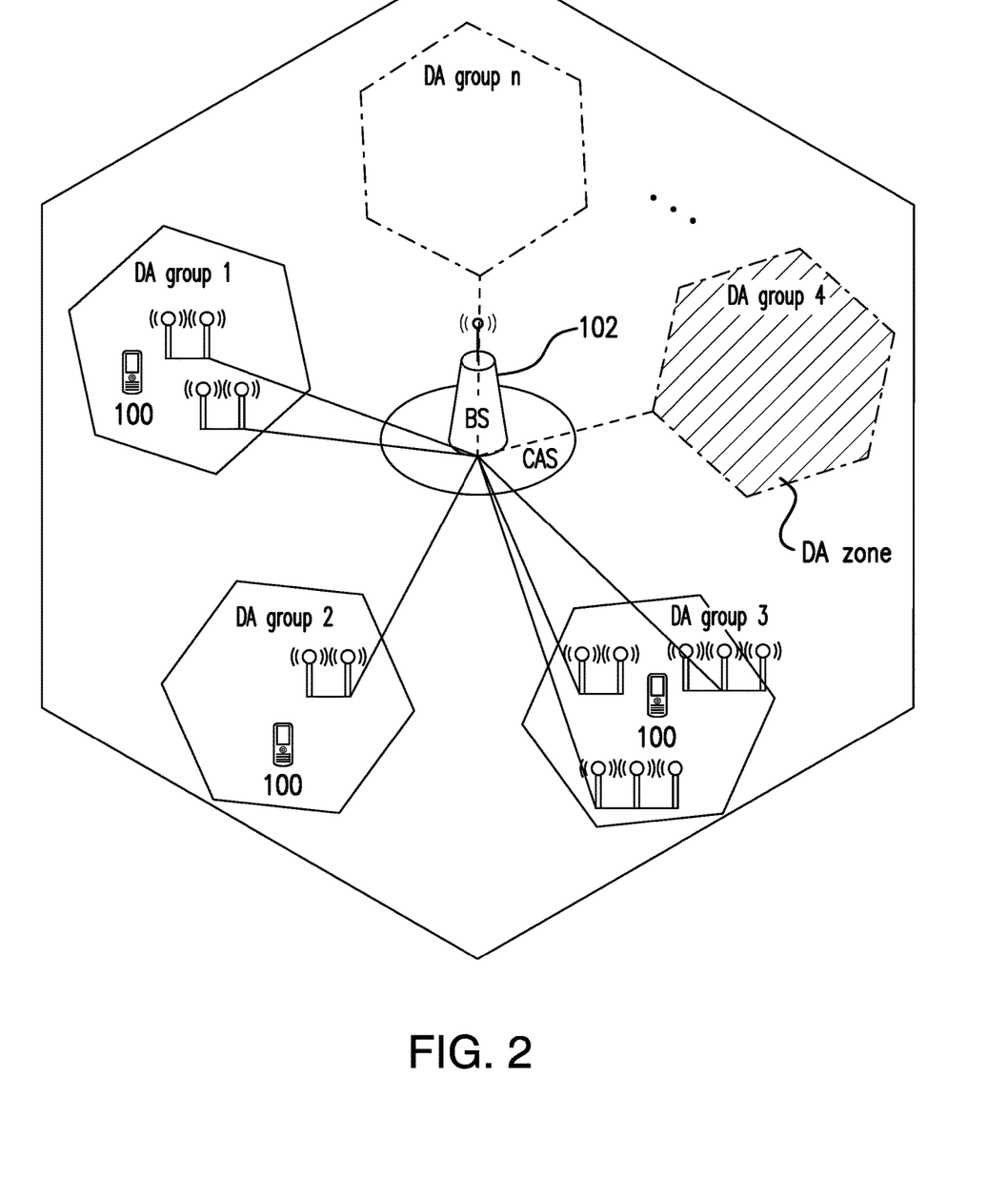
FIG. 2 is a diagram illustrating an example of a distributed antenna system (DAS) structure to which embodiments of the present invention are applied.

FIG. 2 is a diagram illustrating an example of a DAS structure to which embodiments of the present invention are applied. The base station 102 illustrated in FIG. 2 may include a plurality of antennas located at the center of a cell. Referring to FIG. 2, a plurality of centralized antennas (CAs) having a similar effect in path loss due to an antenna interval shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone. The DAs are configured by one or more antennas connected to the base station through one cable. The one or more DAs form one DA group, thereby forming a DA zone. The one or more DAs forming one DA group can correspond to a node in the multi-node system.

The DA group, which includes one or more DAs, may variably be configured depending on the location or receiving status of the devices 100, or may fixedly configured (by the number of maximum antennas used in multiple input multiple output (MIMO) system). The DA zone is defined by the range that the antennas constituting the DA group can transmit or receive a signal. The cell zone illustrated in FIG. 2 includes n number of DA zones. The user equipment that belongs to the DA zone can perform communication with one or more the DAs constituting the DA zone, and the base station 102 can increase a transmission rate by using the DAs and the CAs at the same time during signal transmission to the device belonging to the DA zone.

A CAS that includes a DAS is illustrated in FIG. 2, whereby the base station 102 and the devices 100 can use the DAS in the CAS structure that uses multiple antennas. Although the CAs and the DAs are located separately in FIG. 2 for conciseness of description, they may be located in various manners depending on their embodiments without limitation to the example of FIG. 2.

Figure 3:
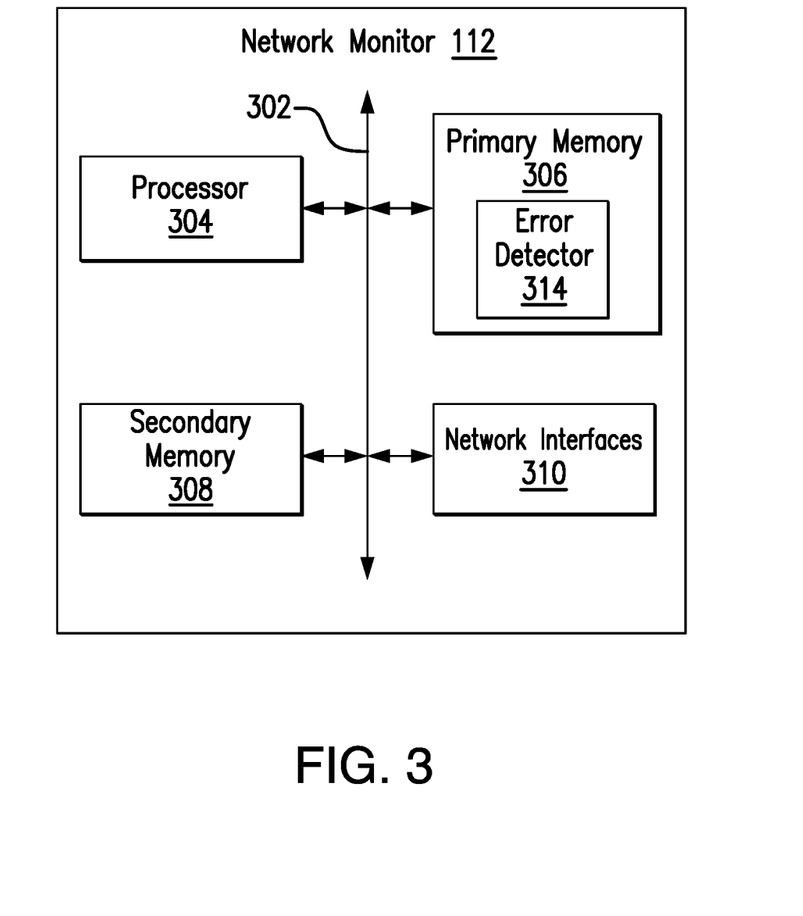
FIG. 3 is a block diagram of the network monitor of FIG. 1, according to one embodiment of the present invention.

FIG. 3 is a block diagram of the network monitor 112, according to one embodiment of the present invention. The network monitor 112 may include, among other components, a processor 304, primary memory 306, secondary memory 308, and one or more network interface(s) 310. These components are connected and communicate via a bus 302. The network monitor 112 may also include other components not illustrated in FIG. 3, such as user input devices (e.g., keyboard and mouse) and display devices (e.g., a display driver card).

The processor 304 executes computer instructions stored in the primary memory 306 and/or the secondary memory 308. Although only a single processor is illustrated in FIG. 3, two or more processors may be used to increase the computing capacity and the processing speed of the network monitor 112.

The primary memory 306 is a computer readable storage medium that stores, among other data, computer instruction modules for processing, storing and retrieving network traffic data. The primary memory 306 may be implemented in various data storage devices (e.g., Random-Access Memory (RAM)) having a faster access speed compared to the secondary memory 308.

The secondary memory 308 may be a secondary storage device for storing, among others, the processed network planning data sets. The secondary memory 308 may be embodied, for example, as a solid-state drive, hard disk or other memory devices capable of storing a large amount of data compared to the primary memory 306.

The network interfaces 310 may include a NIC (network interface card) or other standard network interfaces to receive CTR data sets. For example, the network interfaces 310 may be an Ethernet interface, a WiFi (IEEE 802.11) interface or other types of wired or wireless network interfaces. In one embodiment, two or more network interfaces are used to communicate with different types of networks or perform specialized functions.

In one embodiment, the network interface 310 sends the call trace record sets directly to an error detector 314. The network interface 310 may send one data set of CTR data to the error detector 314 for processing and another CTR data set for storing in the secondary memory 308. Alternatively, the network interface 310 may send the CTR data to the error detector 314 and not to the secondary memory 308. That is, the error detector 314 receives the CTR data sets from the network interface 310, compares CTR information with corresponding information stored in the planning repository, identifies one or more errors based on the analysis and sends the corrected information to the secondary memory 308. By receiving the CTR data directly from the network interface 310, the error detector 314 can process the CTR data at a high speed without delays associated with accessing the secondary memory 308.

Figure 4:
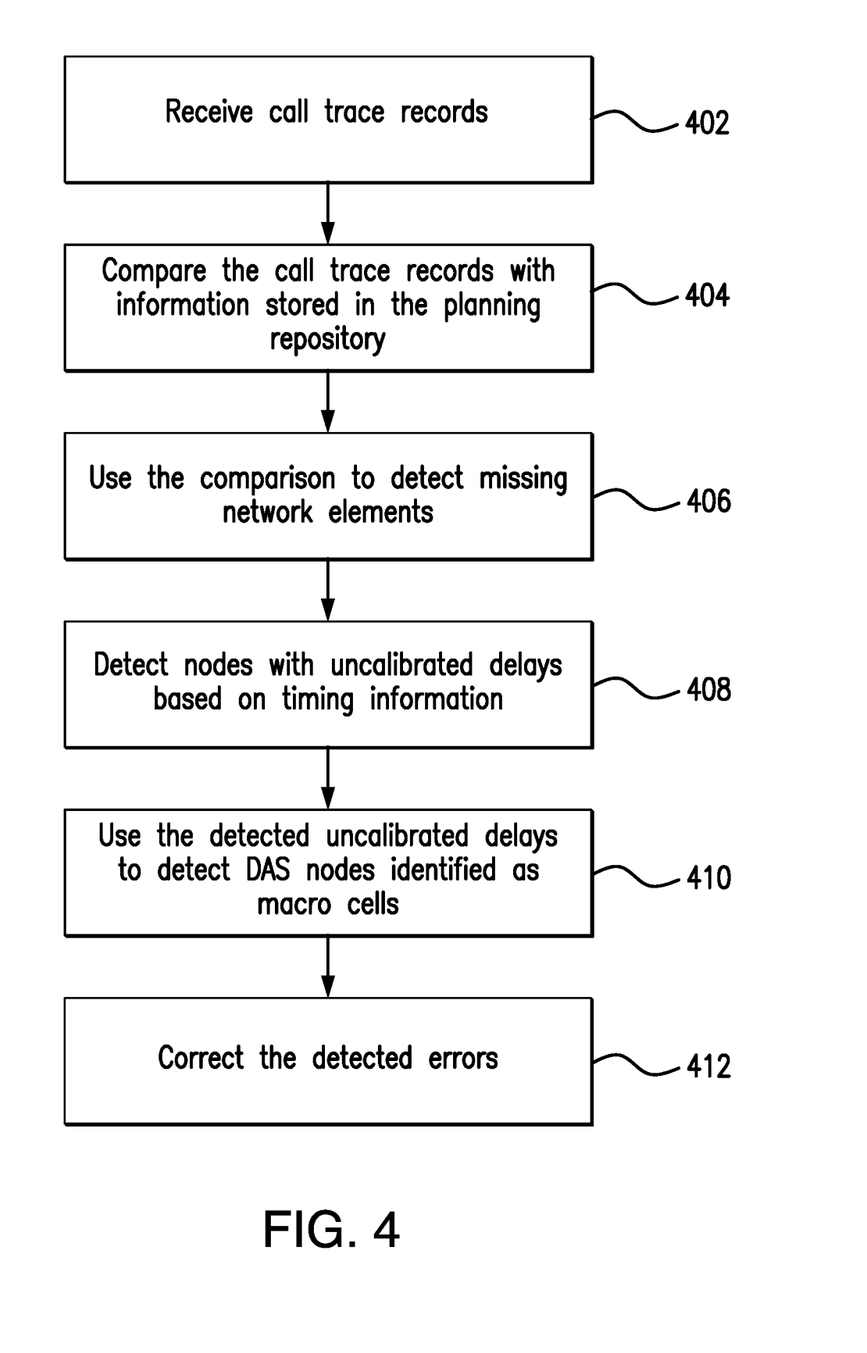
FIG. 4 is a flowchart illustrating a method for correcting network planning data in a wireless communication network, in accordance with illustrative embodiments of the present invention.

FIG. 4 is a flowchart illustrating a method for correcting network planning data in a wireless network, in accordance with illustrative embodiments of the present invention. Before turning to description of FIG. 4, it is noted that the flow diagrams shown therein is described, by way of example, with reference to components shown in FIGS. 1-3, although these operational steps may be carried out in any system and are not limited to the scenario shown in the aforementioned figure. Additionally, the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

According to an embodiment of the present invention, at step 402, the error detector 314 receives a subset of CTRs from the service repository 114. As noted above, the CTRs are transmitted to equipment functions that aggregate the CTRs for the purpose of service billing and other functions. Certain types of CTRs can be based on, or based in part on, CDRs or modifications of CDRs. At least in some embodiments, users may set up and/or configure a CDR profile. The profile is a filter having certain criteria configured by a user that defines communication events to be captured by CTRs.

At step 404, the error detector 314 compares information in the received subset of CTR with corresponding information stored in the planning repository 118. The planning repository 118 contains information related to network traffic, network element locations and network element connectivity. For instance, such information may describe the core network connectivity between base stations 102 and network elements connected to each base station 102. Information stored in the planning repository 118 also includes the location of each component in network 101 together with geographic information. As a non-limiting example of the comparison that could be performed at step 404, the error detector 314 may identify all cell identifiers (cell IDs) referenced in the received CTRs and may compare these cell identifiers with the list of the cell IDs stored in the planning repository 118 to determine if any of the cell identifiers referenced in the CTRs do not exist in the planning repository 118.

According to an embodiment of the present invention, at step 406, the error detector 314 may detect actual network elements missing from the planning repository information. One approach for locating and identifying missing network elements involves using comparison performed at step 404 or other comparison between the CTRs and corresponding planning repository information. More specifically, the error detector 314 may evaluate cell ID references in the logged measurements configuration stored in the CTRs with the planning repository information to ensure that neighbor cells are identified even if the CTR traces from those cells are not configured. The logged measurements configuration may be transmitted through a downlink control channel by being included in an RRC message. The logged measurements configuration may include a list of parameters corresponding to a serving cell and the neighbor cells, such as cell carrier frequency, scrambling code, etc. In one embodiment, step 406 further involves the error detector 314 selectively generating a report listing at least one cell identifier not included in the planning repository information.

Next, at step 408, the error detector 314 may detect nodes with uncalibrated media latency in the wireless network 101 based on timing advance information. Generally, a network base station may utilize timing advance values to communicate with user equipment 100*b* in communication with that base station 102*a*. Timing advance values are used by the mobile devices 100*b* to adjust for signal propagation delays that occur due to a number of factors, including differences in distance between the devices 100*b* and the base station 102*a*. Transmitting nodes (tower transmitters/transceivers) will have best coverage close to the transmitter, so in urban areas there will be a significant population of timing advance values closer to the serving cell. In rural areas there may be low population of timing advance values near the transmitter/transceivers locations. Such cells are often designed to provide long-range coverage in areas of higher inter-site distance between the cells.

It should be noted that there will be a small number of false positives in timing advance value detection, so finding the minimum or maximum latency can be misleading. Hence, in an embodiment of the present invention, the error detector 314 is configured to perform more robust analysis that considers the distribution rather than simply a minimum and maximum value between which there is a certain confidence a timing advance value lies. By looking at the distribution of timing advance values, the error detector 314 can determine whether the distribution is consistent with the morphology, and flag cells which have unexpected distribution. In other words, at step 408, the error detector 314 may analyze distribution of timing advance values associated with at least one device (user equipment element) 100 referenced in the received CTR and may determine geographic bin information for each user equipment element 100 based on the coverage area information included in the CTR. Furthermore, the error detector 314 is configured to analyze a network model representing a coverage area corresponding to the determined geographic bin location and identify one or more elements having the distribution of timing advance values inconsistent with the analyzed network model.

In an embodiment in which the network elements include one or more cells (e.g., macro cells) and one or more eNodeBs 102*a*, at step 408, the error detector 314 may determine the timing advance value from the macro cell for all measurements made by that macro cell. Next, the error detector 314 may calculate timing advance value at a predetermined percentile (e.g., 20th percentile) of all call trace records generated by that enodeB 102*a*. Once this timing advance value is calculated, the error detector 314 may determine if it is larger than the distance to the nearest non-co-located neighboring eNodeB within the coverage area (also known as the inter-site distance) of a source cell. The error detector 314 may report to a user (via GUI) all macro cells that pass such determination.

In an alternative embodiment in which the network elements also include one or more high capacity cells (macro cells) and one or more eNodeBs 102*a*, at step 408, the error detector 314 may determine the timing advance value from the macro cell for all measurements made by that macro cell. Next, the error detector 314 may calculate timing advance value at a first predetermined percentile (e.g., 20th percentile) and a second predetermined percentile (e.g., 80th percentile) of all call trace records generated by that enodeB 102*a*. In this embodiment, the error detector 314 may report to a user all macro cells for which the ratio of the second predetermined percentile value to the first predetermined percentile value is less than a predetermined threshold value (e.g., 2). All reported cells will have performance degradation related to uncalibrated media latency.

According to an embodiment of the present invention, at step 410, the error detector 314 may use the high capacity cells with uncalibrated media latency identified in step 408 to detect DAS nodes identified as a high capacity cell. In most traditional cellular networks, these cells will be DAS nodes, since high capacity cells do not typically have performance degradation related to network link latency between the base station and the transmitting element. This step further involves the error detector 314 comparing the identified network elements with corresponding information stored in the planning repository to determine if the identified network elements are labeled as DAS nodes in the planning repository 118. The error detector 314 may report to a user identified network elements that are not labeled as DAS nodes in the planning repository based on the comparison.

At step 412, the error detector 304 may correct the errors detected in steps 406-410. For instance, the error detector 314 may update the network elements identified in step 410 to be labeled as DAS nodes in the planning repository 418.

Advantageously, the various embodiments described herein provide more efficient correction of planning data in wireless networks. Certain CTRs are used to identify errors (discrepancies) in planning data. Non-limiting examples of such errors may include specific cells that are entirely missing from the planning data, nodes with uncalibrated media latencies and DAS nodes that are identified as macro cells in the planning data. In the aforementioned embodiments, a system includes a planning repository that stores information on network traffic, network element locations and network element connectivity and a repository of a wireless network containing a plurality of CTRs. An information processing system is also included that is configured to compare information in the CTRs with corresponding information stored in the planning repository to identify one or more errors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for correcting network planning data, the system comprising:

a planning repository comprising information on network traffic, network element locations, and network element connectivity;

a repository of a wireless network comprising a plurality of call trace records; and an information processing system comprising a processor and a memory device coupled to the processor in communication with the planning database and with the repository of the wireless network, the memory device containing a set of instructions that, when executed by the processor, cause the processor to:

receive call trace records from a wireless network interface and 1) send one set of the call trace records to an error detector module, and 2) send another set of the call trace records for storage in memory; and compare in the error detector module information in the at least one call trace record received directly from the wireless network interface with corresponding information stored in the planning repository to identify one or more errors in the information stored in the planning repository wherein the set of instructions that cause the processor to identify one or more errors further cause the processor to identify one or more network elements having uncalibrated media latency based on timing advance information.

2. The system of claim 1, wherein the set of instructions further cause the processor to correct the information stored in the planning repository based on the comparison.

3. The system of claim 1, wherein the set of instructions that cause the processor to identify one or more errors further cause the processor to identify one or more network elements not included in the information stored in the planning repository.

4. The system of claim 3, wherein the set of instructions that cause the processor to identify one or more network elements not included in the information stored in the planning repository further cause the processor to:

identify one or more cell identifiers referenced in the at least one received call trace record;

determine if the information stored in the planning repository includes each of the identified cell identifiers; and selectively generate a report identifying at least one cell identifier not included in the planning repository responsive to the determination.

5. The system of claim 1, wherein the network elements comprise one or more high capacity cells and one or more Distributed Antenna System (DAS) nodes and wherein the set of instructions that cause the processor to identify one or more errors further cause the processor to determine if at least one of the high capacity cells is identified as a DAS node in the planning repository.

6. The system of claim 1, wherein the network elements comprise one or more User Equipment (UE) elements and wherein the set of instructions that cause the processor to identify one or more network elements having uncalibrated media latency further cause the processor to:

analyze distribution of timing advance values associated with at least one UE element referenced in the at least one received call trace record;

determine geographical location of each of the at least one UE element based on the information included in the received call trace record;

analyze a network model representing a segment of the network corresponding to the determined geographical location; and identify one or more elements having the distribution of timing advance values inconsistent with the analyzed network model.

7. The system of claim 1, wherein the network elements comprise one or more high capacity cells and one or more eNodeBs and wherein the set of instructions that cause the processor to identify one or more network elements having uncalibrated media latency further cause the processor to:
analyze distribution of timing advance values associated with a plurality of signal measurements made by at least one high capacity cell referenced in the at least one received call trace record generated by a serving eNodeB;
calculate at least one value indicative of an nth percentile of the analyzed timing advance values;
determine if the calculated at least one value is greater than an inter-site distance value between the serving eNodeB and a neighboring eNodeB nearest to the serving eNodeB; and
identify at least one high capacity cell responsive to determination that the calculated at least one value is greater than the inter-site distance.

8. The system of claim 7, wherein the $n^{th}$ percentile comprises approximately $20^{th}$ percentile.

9. The system of claim 1, wherein the network elements comprise one or more cells and one or more eNodeBs and wherein the set of instructions that cause the processor to identify one or more network elements having uncalibrated media latency further cause the processor to:
analyze distribution of timing advance values associated with a plurality of signal measurements made by at least one cell referenced in the at least one received call trace record generated by a serving eNodeB;
calculate a first value indicative of approximately a 20th percentile of the analyzed timing advance values and a second value indicative of approximately an 80th percentile of the analyzed timing advance values;
calculate a ratio of the second and first values;
determine if the calculated ratio is less than a predefined threshold value; and
identify at least one cell responsive to determination that the calculated ratio is less than the predefined threshold value.

10. The system of claim 1, wherein the network elements comprise one or more high capacity cells and one or more DAS nodes and wherein the set of instructions that cause the processor to identify one or more network elements having uncalibrated media latency further cause the processor to:
compare the identified one or more network elements with corresponding information stored in the planning repository to determine if the identified network elements are labeled as DAS nodes in the planning repository; and
identify one or more network elements that are not labeled as DAS nodes based on the comparison.

11. A method for correcting network planning data in a wireless communication system, the method comprising steps of:
receiving call trace records from a wireless network interface and 1) send one set of the call trace records to an error detector module, and 2) send another set of the call trace records for storage in memory; and
comparing, in the error detector module information in the at least one call trace record received directly from the wireless network interface with corresponding information stored in a planning repository to identify one or more errors in the information stored in the planning repository,
wherein the planning repository stores information on network traffic, network element locations, and network element connectivity and wherein the step of identifying one or more errors further comprises identifying one or more network elements having uncalibrated media latency based on timing advance information.

12. The method of claim 11, further comprising the step of correcting the information stored in the planning repository based on the comparison.

13. The method of claim 11, wherein the step of identifying one or more errors further comprises identifying one or more network elements not included in the information stored in the planning repository.

14. The method of claim 13, wherein the step of identifying one or more network elements not included in the information stored in the planning repository further comprises:
identifying one or more cell identifiers referenced in the at least one received call trace record;
determining if the information stored in the planning repository includes each of the identified cell identifiers; and
selectively generating a report identifying at least one cell identifier not included in the planning repository responsive to the determination.

15. The method of claim 11, wherein the network elements comprise one or more high capacity cells and one or more Distributed Antenna System (DAS) nodes and wherein the step of identifying one or more errors further comprises determining if at least one of the high capacity cells is identified as a DAS node in the planning repository.

16. The method of claim 11, wherein the network elements comprise one or more User Equipment (UE) elements and wherein the step of identifying one or more network elements having uncalibrated media latency further comprises:
analyzing distribution of timing advance values associated with at least one UE element referenced in the at least one received call trace record;
determining geographical location of each of the at least one UE element based on the information included in the received call trace record;
analyzing a network model representing a segment of the network corresponding to the determined geographical location; and
identifying one or more elements having the distribution of timing advance values inconsistent with the analyzed network model.

17. The method of claim 11, wherein the network elements comprise one or more cells and one or more eNodeBs and wherein the step of identifying one or more network elements having uncalibrated media latency further comprises:
analyzing distribution of timing advance values associated with a plurality of signal measurements made by at least one cell referenced in the at least one received call trace record generated by a serving eNodeB;
calculating at least one value indicative of an nth percentile of the analyzed timing advance values;
determining if the calculated at least one value is greater than an inter-site distance value between the serving eNodeB and a neighboring eNodeB nearest to the serving eNodeB; and identifying at least one cell responsive to determination that the calculated at least one value is greater than the inter-site distance.

18. The method of claim 17, wherein the $n^{th}$ percentile comprises approximately 20th percentile.

\* \* \* \* \*